(12) United States Patent
Uchida

(10) Patent No.: US 8,508,641 B2
(45) Date of Patent: Aug. 13, 2013

(54) SOLID-STATE IMAGE SENSOR AND IMAGING APPARATUS

(75) Inventor: Mineo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 13/016,903

(22) Filed: Jan. 28, 2011

(65) Prior Publication Data

US 2011/0193983 A1 Aug. 11, 2011

(30) Foreign Application Priority Data

Feb. 8, 2010 (JP) .................................. 2010-025863

(51) Int. Cl.
*H04N 5/335* (2011.01)

(52) U.S. Cl.
USPC .......................... 348/308; 348/272; 250/208.1

(58) Field of Classification Search
USPC ........................... 348/308, 272, 275, 278–280
See application file for complete search history.

(56) References Cited

U.S. PATENT DOCUMENTS

| 6,992,714 | B1 * | 1/2006 | Hashimoto et al. | ........... 348/273 |
| 2006/0108506 | A1 * | 5/2006 | Yang et al. | ................. 250/208.1 |
| 2010/0006743 | A1 * | 1/2010 | Kato et al. | ................. 250/208.1 |
| 2010/0271523 | A1 | 10/2010 | Hara | |
| 2011/0080492 | A1 * | 4/2011 | Matsuda et al. | ........... 348/222.1 |
| 2011/0176045 | A1 * | 7/2011 | Ahn et al. | ..................... 348/308 |

FOREIGN PATENT DOCUMENTS

| JP | 2000-324397 A | 11/2000 |
| JP | 2009-159335 A | 7/2009 |

* cited by examiner

*Primary Examiner* — Tuan Ho
*Assistant Examiner* — Zhenzhen Wu
(74) *Attorney, Agent, or Firm* — Canon USA, Inc., IP Division

(57) ABSTRACT

In an imaging mode for reading a part of a plurality of pixels, signals of same color adjacent pixels are simultaneously read out to capacities, and at least two capacities in a same pixel row are once short-circuited. Further, capacities of a plurality of the pixel rows are once short-circuited to perform operation for averaging the pixels in vertical and horizontal directions. With the configuration, it is possible to solve deterioration in image quality due to occurrence of moire caused by reduction in sampling frequency in a thinning reading operation mode capable of high-speed reading.

13 Claims, 17 Drawing Sheets

| FIG.3A |
| FIG.3B |

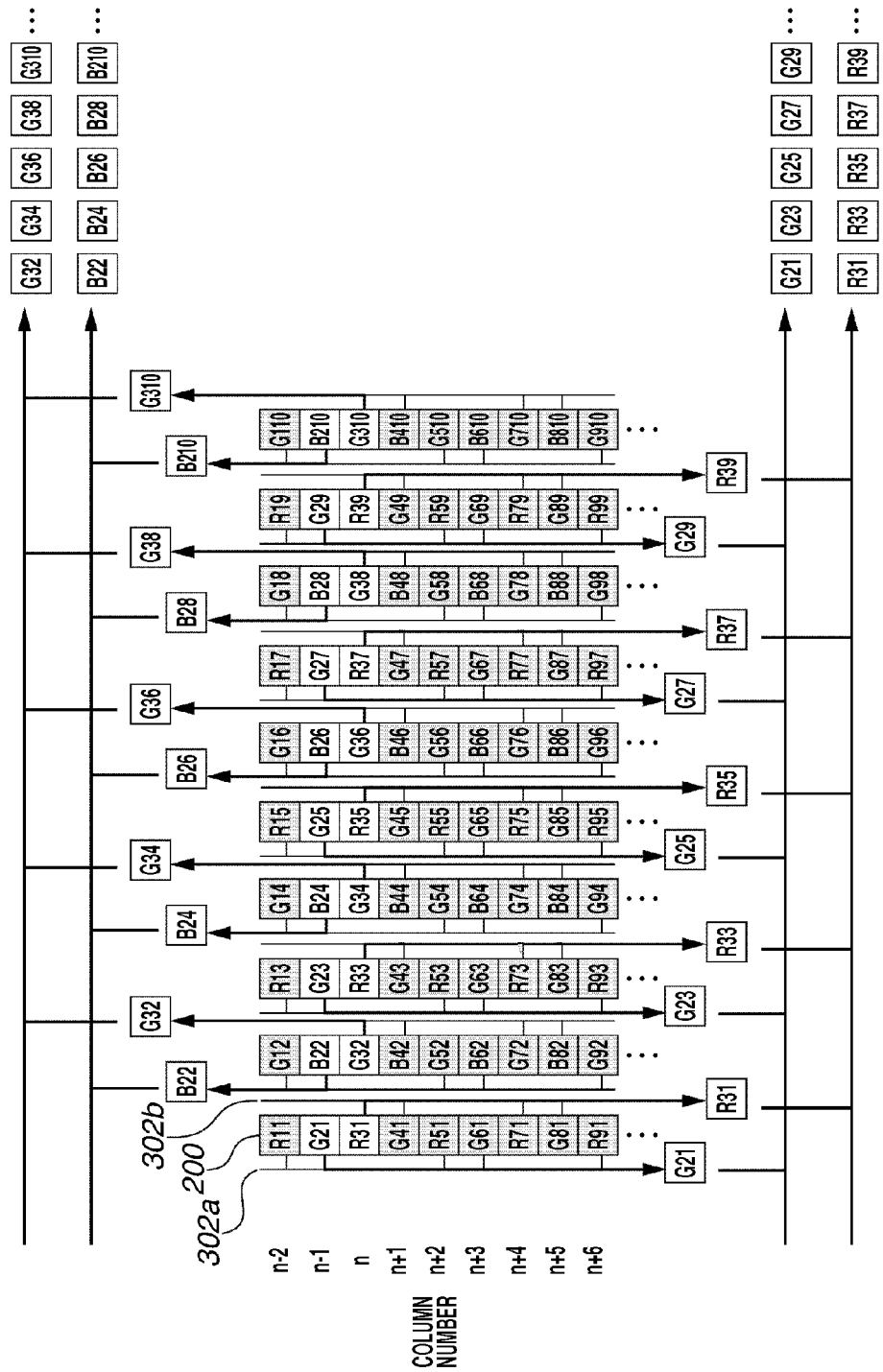

| FIG.10A |
| FIG.10B |

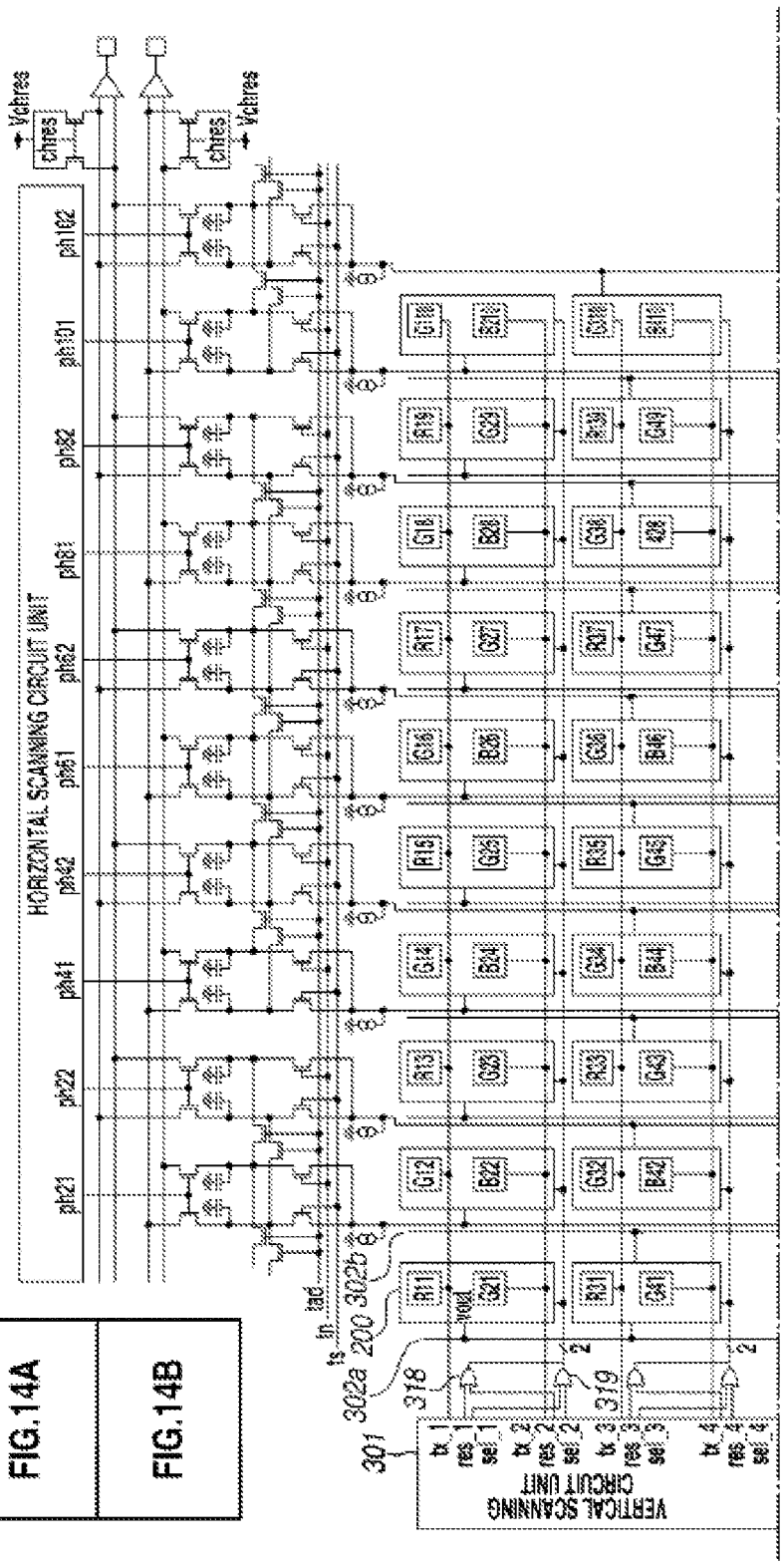

SOLID-STATE IMAGE SENSOR AND IMAGING APPARATUS

BACKGROUND OF THE INVENTION

1. Field of the Invention

The present invention relates to a solid-state image sensor and an imaging apparatus.

2. Description of the Related Art

An imaging apparatus including a digital camera and a digital video camera which uses an image sensor such as a complementary metal oxide semiconductor (CMOS) image sensor to capture a still image or a moving image is widespread. In the imaging apparatus, a number of pixels of the image sensor has increased to satisfy a demand for image quality of a still image with high definition. On the other hand, demands for rise in continuous shooting speed and frame rate in a moving image also increase.

In order to satisfy both the contradictory demands, a configuration is discussed to arrange a plurality of vertical signal lines in one pixel row (refer to, e.g., Japanese Patent Application Laid-Open No. 2000-324397). By arranging a plurality of vertical output lines on the similar pixel row, a reading speed from the image sensor can be increased. Further, in order to realize high-speed continuous shooting and a high frame rate of a moving image, in a predetermined shooting mode, a thinning reading operation is generally performed to thin a pixel signal from the image sensor and read the pixel signal.

However, the thinning reading operation has a problem of deterioration in image quality because of occurrence of moire caused by reduction in sampling frequency.

SUMMARY OF THE INVENTION

The present invention is directed to a technique for preventing deterioration in image quality due to a thinning reading operation while maintaining a high continuous-shooting speed and a high frame rate.

According to an embodiment, a solid-state image sensor includes a pixel array, first and second output lines, first and second capacities, and a switch. Each pixel of the pixel array includes a photoelectric conversion element to photoelectrically convert an object image and is two-dimensionally arranged in a column direction of a column and in a row direction of a row. The first and second output lines are arranged in each column to transfer a pixel signal output from each pixel in the column direction. Pixel signals of same color adjacent pixels in the column direction in a same column of the pixel array are alternately output to the first and second output lines. The first and second capacities temporarily store the pixel signals of the same color adjacent pixels transferred in the column direction from the respective first and second output lines. The switch short-circuits the first capacity and the second capacity after the first and second capacities store the pixel signals of the same color adjacent pixels.

With the above configuration, it is possible to prevent the deterioration in image quality due to the thinning reading operation while maintaining a high continuous-shooting speed and a high frame rate.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a reading operation of all pixels in the image sensor according to the first exemplary embodiment.

FIG. 14 and FIGS. 14A and 14B illustrate a configuration of a reading circuit in the image sensor according to the third exemplary embodiment.

DESCRIPTION OF THE EMBODIMENTS

Various exemplary embodiments, features, and aspects of the invention will be described in detail below with reference to the drawings.

Figure 1:
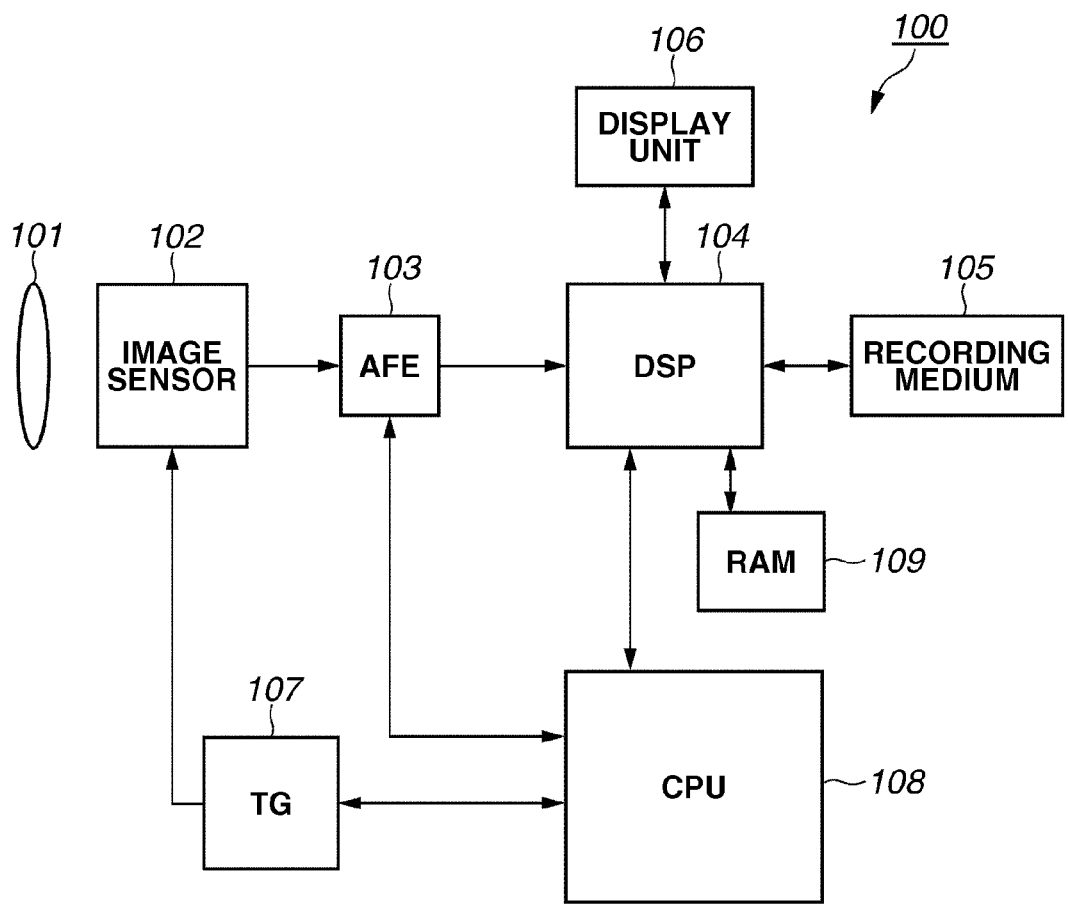
FIG. 1 illustrates a block diagram of a main portion of an imaging apparatus according to a first exemplary embodiment.

FIG. 1 illustrates an entire configuration of an imaging apparatus 100 according to a first exemplary embodiment. An imaging lens 101 forms an image on an image sensor 102 from light from an object, and a solid-state image sensor (hereinafter, referred to as an image sensor) 102 photoelectrically converts an object image formed through the imaging lens 101. As the image sensor 102, a CMOS image sensor may be used. An analog front end (AFE) 103 converts an analog image signal output from the image sensor 102 into a digital signal. A digital signal processer (DSP) 104 performs predetermined image processing and compression and decompression processing on the digital image signal output from the AFE 103.

Image data subjected to the various processing by the DSP 104 is recorded to a recording medium 105. A display unit 106, e.g., a liquid crystal display (LCD) displays a captured image or various menu screens. A timing generator (TG) 107 supplies a drive signal to the image sensor 101. A central processing unit (CPU) 108 controls the AFE 103, the DSP 104, and the TG 107. A random access memory (RAM) 109 temporarily stores image data and is connected to the DSP 104.

Figure 2:
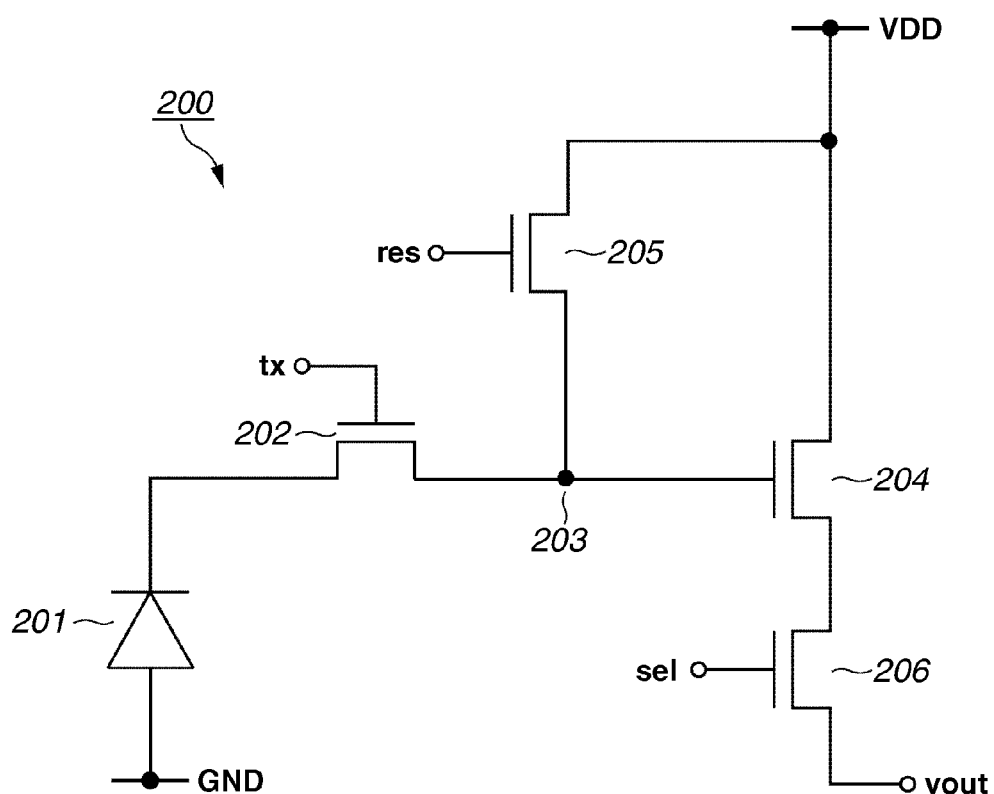
FIG. 2 illustrates a configuration of a pixel portion of the image sensor according to the first exemplary embodiment.
Figures 3, 3A:
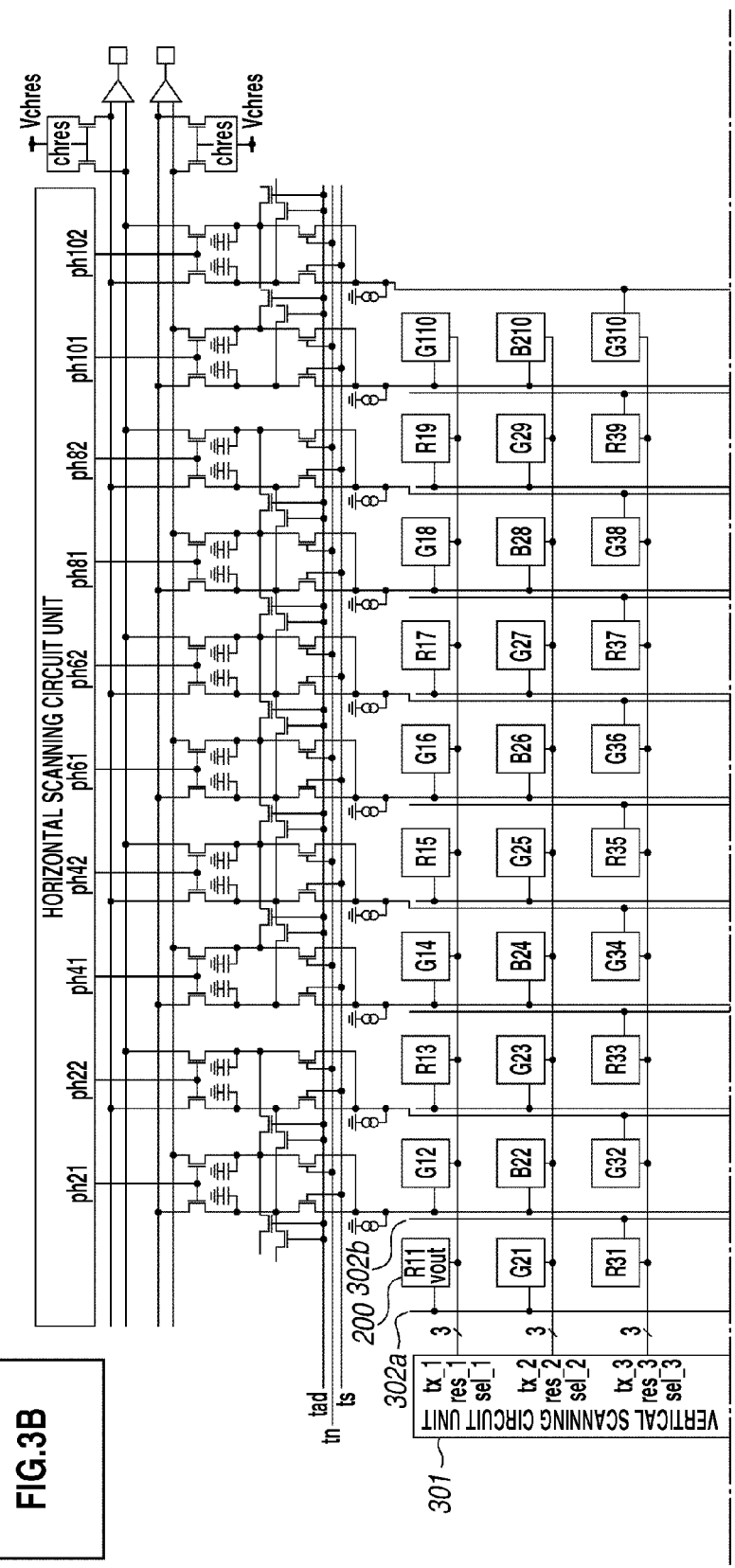
FIG. 3 and FIGS. 3A and 3B illustrate a configuration of a reading circuit in an image sensor according to the first exemplary embodiment.
Figure 3B:
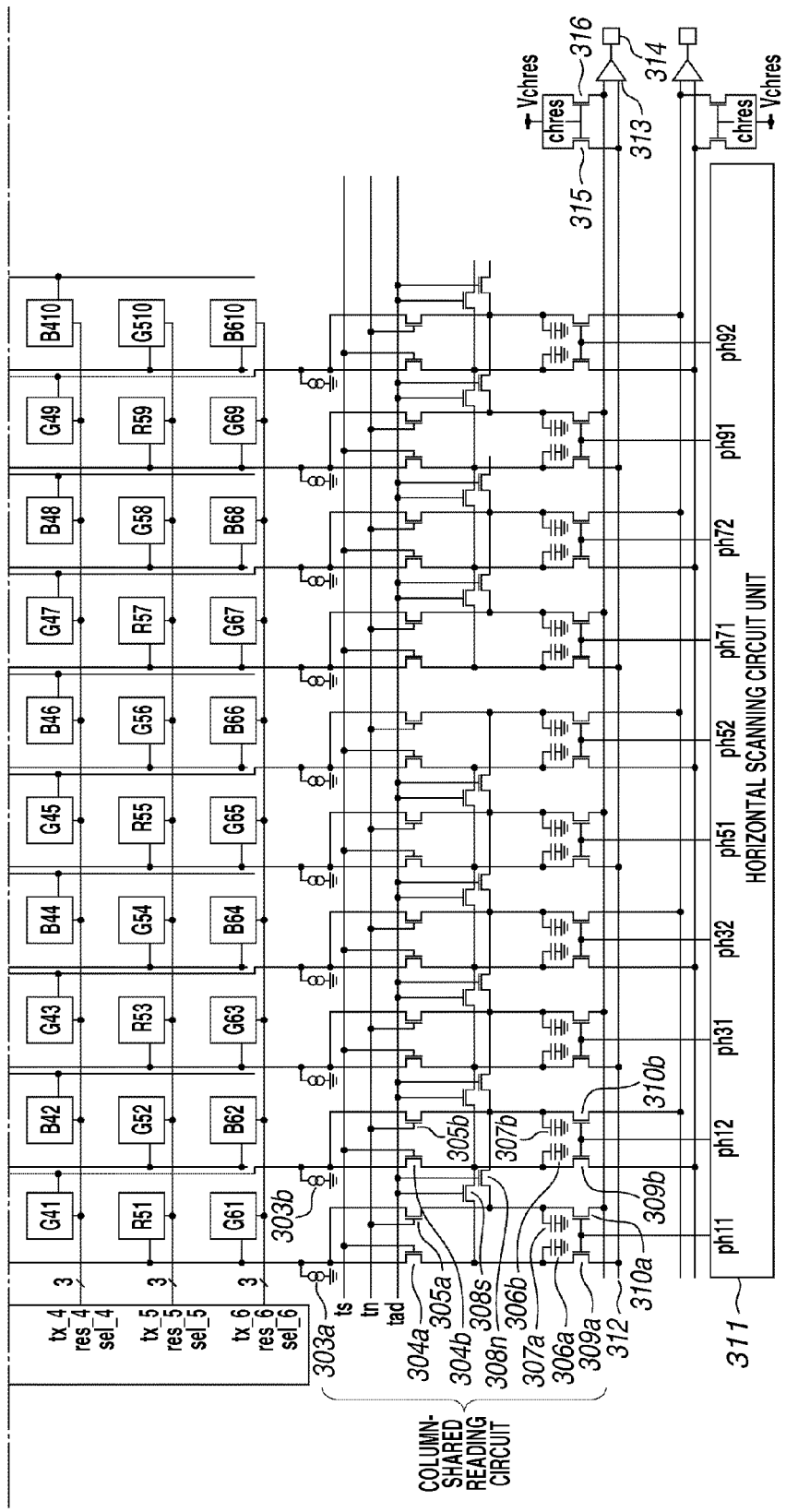

Next, a description is given of the configuration of the image sensor 102 with reference to FIGS. 2, 3A, and 3B. FIG. 2 illustrates a configuration of one pixel 200 in the image sensor 102. Referring to FIG. 2, a photodiode (hereinafter, referred to as a PD) 201 as a photoelectric conversion element photoelectrically converts incident light and stores charges corresponding to an exposure amount. A transfer gate 202 is turned ON by setting a signal tx to a high level, and transfers the charges accumulated in the PD 201 to a floating diffusion (FD) portion 203. The FD portion 203 is connected to a gate of a floating diffusion amplifier 204 (hereinafter, referred to as an FD amplifier), and the FD amplifier 204 converts an amount of charges transferred from the PD 201 into a voltage.

An FD reset switch 205 resets the FD portion 203, and is turned ON by setting a signal res to a high level, so that the FD portion 203 is reset. When the charges in the PD 201 are reset, the transfer gate 202 and the FD reset switch 205 are turned ON by simultaneously setting the signals tx and res to the high level, so that the PD 201 is reset via the FD portion 203. A pixel selection switch 206 is turned ON by setting a signal sel to a high level, and outputs a pixel signal converted into the voltage by the FD amplifier 204 to an output vout of the pixel 200.

FIGS. 3A and 3B illustrate a configuration of a reading circuit in the image sensor 102. Referring to FIGS. 3A and 3B, a plurality of pixels 200 is two-dimensionally arranged in a row direction as a horizontal direction and in a column direction as a vertical direction. Each of the pixels 200 includes a color filter (not illustrated) with a Bayer array. In the drawing, the pixels 200 denoted by R, G, and B** mean that the pixels include red, green, and blue color filters respectively.

A vertical scanning circuit 301 supplies drive signals res1, tx1, and sel1 to the individual pixels 200. Each pixel column includes vertical output lines 302a (first output line) and 302b (second output line), and the output vout of the pixel 200 in each column is connected to the vertical output lines 302a and 302b. As will be obvious with reference to FIGS. 3A and 3B, two vertical output lines are individually arranged to each column to transfer pixel signals output from the pixels in the column direction, and the pixels in each column are connected to the vertical output lines 302a and 302b different every two-row. More specifically, pixel signals of the pixels of the same color which are adjacent in the column direction in the same column of the pixel array are alternately output.

A load current source 303 drives the FD amplifier 204 of the pixel selected by the pixel selection switch 206. S signal transfer switches 304a and 304b and N signal transfer switches 305a and 305b transfer a signal component S or a noise component N read from the pixel 200 to respective storage capacities.

When a signal ts is set to the high level, the S signal transfer switch 304a (304b) is turned ON, and the signal of the vertical output line 302a (302b) is temporarily stored in an S signal storage capacity 306a (306b) (first capacity or second capacity). Further, when a signal tn is set to the high level, the N signal transfer switch 305a (305b) is turned ON, and the signal of the vertical output lines 302a (302b) is temporarily stored in an N signal storage capacity 307a (307b).

Pixel addition switches 308s and 308n are tuned ON by setting a signal tad to the high level. If the pixel addition switch 308s is once turned ON and is then turned OFF, the S signal storage capacities 306a and 306b connected to both terminals are shunted, so that pixel signals of the adjacent pixels of the same color stored in the storage capacities 306a and 306b are averaged. Similarly, the N signal storage capacities 307a and 307b are shunted, and the stored pixel signals are averaged by turning the pixel addition switch 308n ON and OFF.

Horizontal transfer switches 309a (309b) and 310a (310b) are turned ON by setting a column selection signal ph (ph11, ph12 . . . ) supplied from a horizontal scanning circuit 311 to the high level. When the horizontal transfer switches 309a and 310a (309b and 310b) are turned ON by the column selection signal ph11 (ph12), signals in the S signal storage capacity 306a (306b) and the N signal storage capacity 307a (307b) are transferred to horizontal output lines 312 connected thereto.

The horizontal output line 312 is connected to an input of a differential amplifier 313. The differential amplifier 313 calculates a difference between the S signal and the N signal while multiplying the difference by a predetermined gain, and outputs a final image signal to an output terminal 314. Horizontal output line reset switches 315 and 316 are turned ON by setting a signal chres to the high level, and the horizontal output line 312 is reset to a reset voltage chres.

As illustrated in FIGS. 3A and 3B, the reading circuit after a column shared reading circuit is similarly arranged to the top and bottom of the drawing. A signal of an odd-numbered column and a signal of an even-numbered column are read using the circuits on the different sides. Signals in two vertical output lines (first and second output lines, e.g., lines 302a and 302b) in the same column are read to a column-shared reading circuit on the same side.

Figure 5:
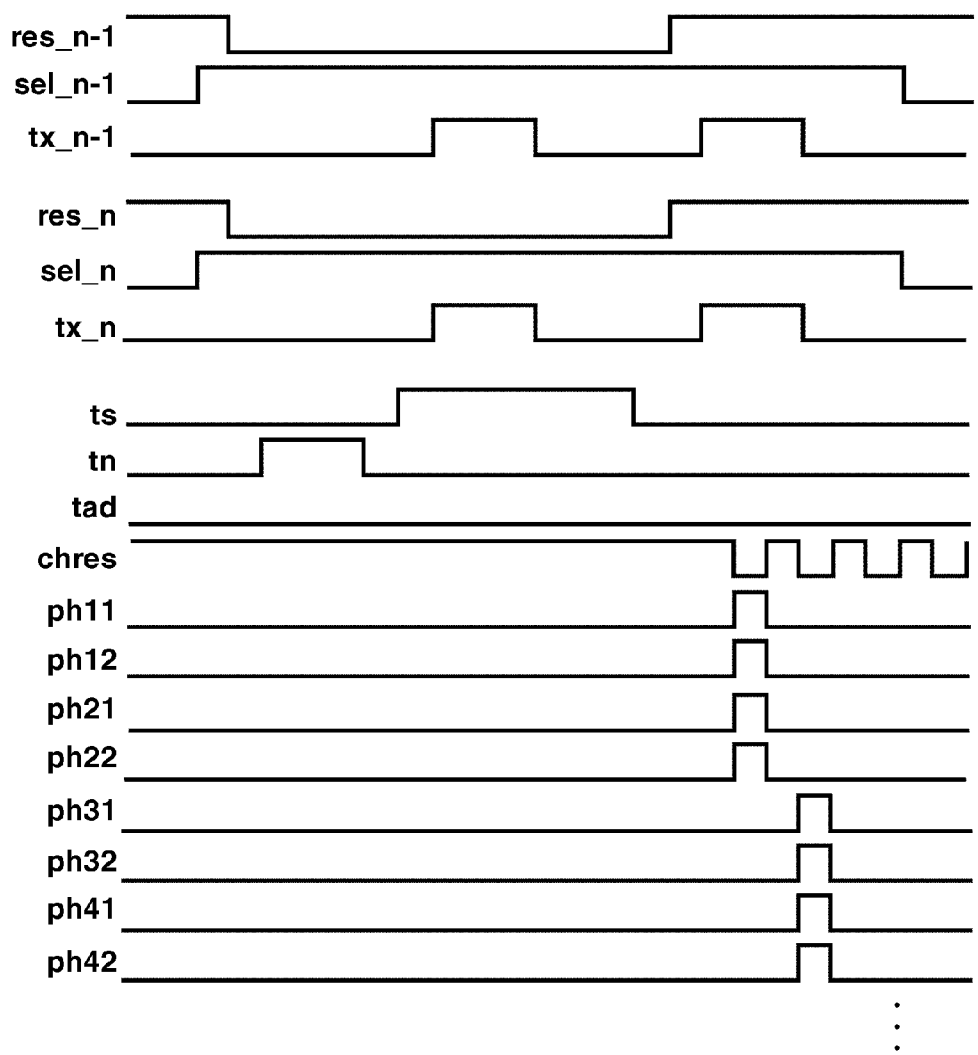
FIG. 5 illustrates a timing chart of the reading operation of all pixels in the image sensor according to the first exemplary embodiment.

Next, reading operations of the image sensor 102 in various shooting modes are described. First, an all-pixel reading operation mode is described with reference to FIGS. 4 and 5. FIG. 4 schematically illustrates a reading operation of an (n−1)-th row and an n-th row in the all-pixel reading operation mode. The configurations of the pixels 200 arranged in matrix and the vertical output lines 302a and 302b are described above with reference to FIGS. 3A and 3B. FIG. 5 illustrates a timing chart of the reading operation of the (n−1)-th row and the n-th row. The signal in the (n−1)-th row and the signal in the n-th row are simultaneously read.

In FIG. 5, numbers attached after res, sel, and tx correspond to those of a pixel row from which the signal is read. First, signals sel_n−1 and sel_n are set to the high level, and the pixel selection switches 206 of the pixels in the (n−1)-th row and the n-th row are turned ON. Then, signals res_n−1 and res_n are set to the low level, the FD reset switch 205 is turned OFF, and the resetting of the FD portion 203 is released.

Then, the signal tn is turned ON, and the N signal is stored to the N signal storage capacities 307a and 307b via the N signal transfer switches 305a and 305b. Subsequently, the signal tn is set to the low level, the N signal transfer switches 305a and 305b are turned OFF, the signal ts is then set to the high level, and the S signal transfer switches 304a and 304b are turned ON. Further, signals tx_n−1 and tx_n are set to the high level, so that the transfer gate 202 is turned ON.

With the above operations, the signals stored in the PDs 201 of the selected (n−1)-th row and n-th row are output to the vertical output lines 302a and 302b via the FD amplifier 204 and the pixel selection switch 206. Further, the signals are stored to the S signal storage capacities 306a and 306b via the S signal transfer switches 304a and 304b from the vertical output lines 302a and 302b.

Next, the signals tx and ts are set to the low level, and the transfer gate 202 and the S signal transfer switch 304 are closed. Then, the signals res_n−1 and res_n are set to the high level, the FD reset switch 205 is turned ON, and the FD portion 203 is reset. Then, with the selection signal ph of respective columns controlled by the horizontal scanning circuit 311, the horizontal transfer switches 309a, 309b, 310a, and 310b are sequentially turned ON.

The signal ph is set to the high level, and the signals in the S signal storage capacities 306a and 306b and the N signal storage capacities 307a and 307b in the selected respective columns are output to the output terminal 314 via the horizontal output line 312 and the differential amplifier 313. While the signals of respective columns are read by the signal ph, the signal chres is set to the high level to turn the horizontal output line reset switches 315 and 3160N. Thus, the horizontal output line 312 is once reset to a reset voltage Vchres. Further, while the signals of respective columns are output by the signal ph, the signals res_n−1 and res_n and signals tx_n−1 and tx_n are set to the high level. With this operation, the PD 201 is reset via the FD reset switch 205 and the transfer gate 202.

With the above described operations, the signals in the (n−1)-th row and the n-th row are simultaneously read. Subsequently, the operation shifts to the reading operation of an (n+1)-th row and an (n+2)-th row.

Figure 6:
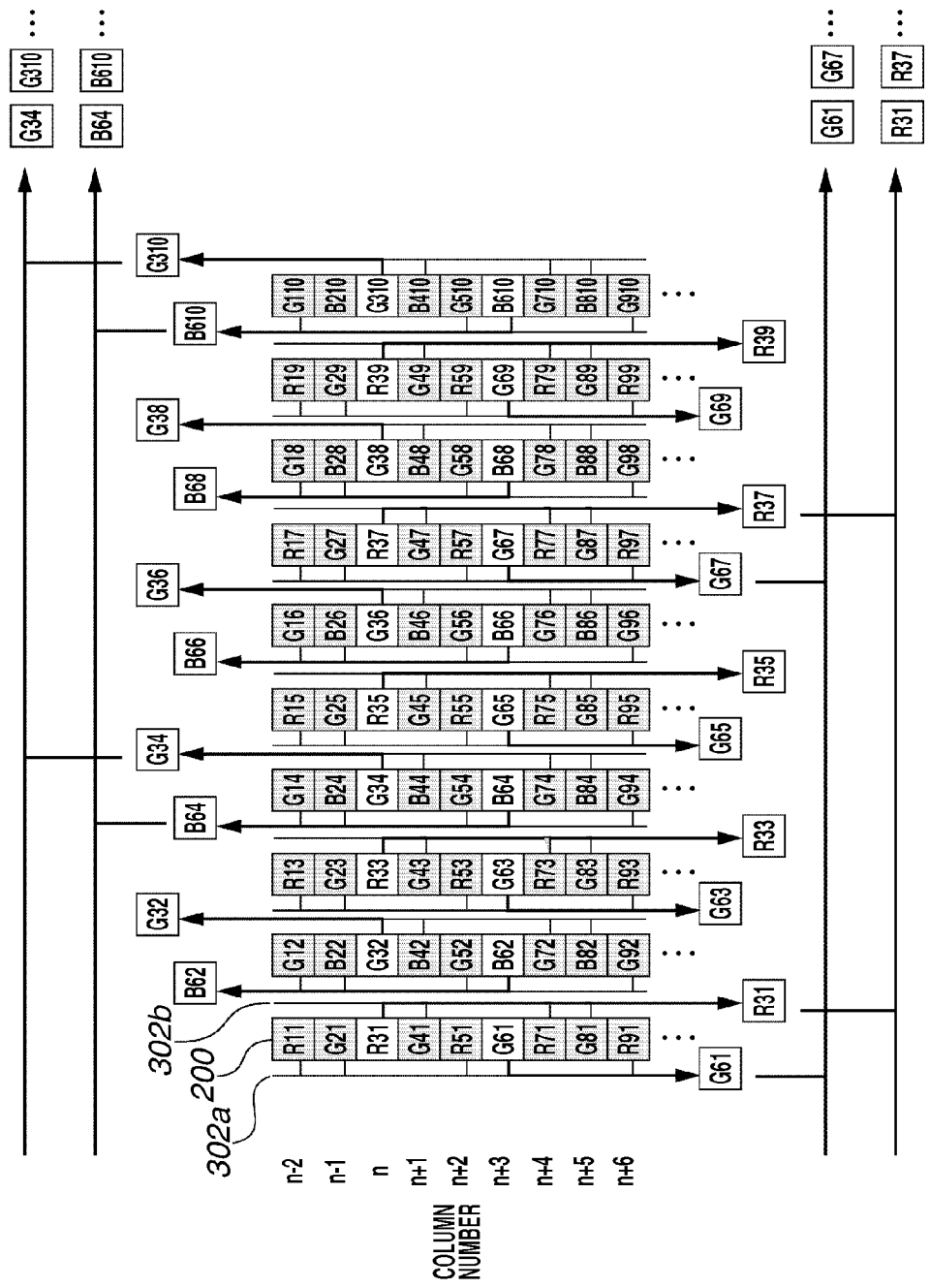
FIG. 6 illustrates a thinning reading operation in the image sensor according to the first exemplary embodiment.

Next, a thinning reading operation mode is described with reference to FIGS. 6 and 7. Here, the number of pixels in the horizontal and vertical directions is thinned to one third thereof. FIG. 6 schematically shows the reading operation of the signals in the n-th row and (n+3)-th row. The signals in the (n+1)-th row and the (n+2)-th row are not read.

Figure 7:
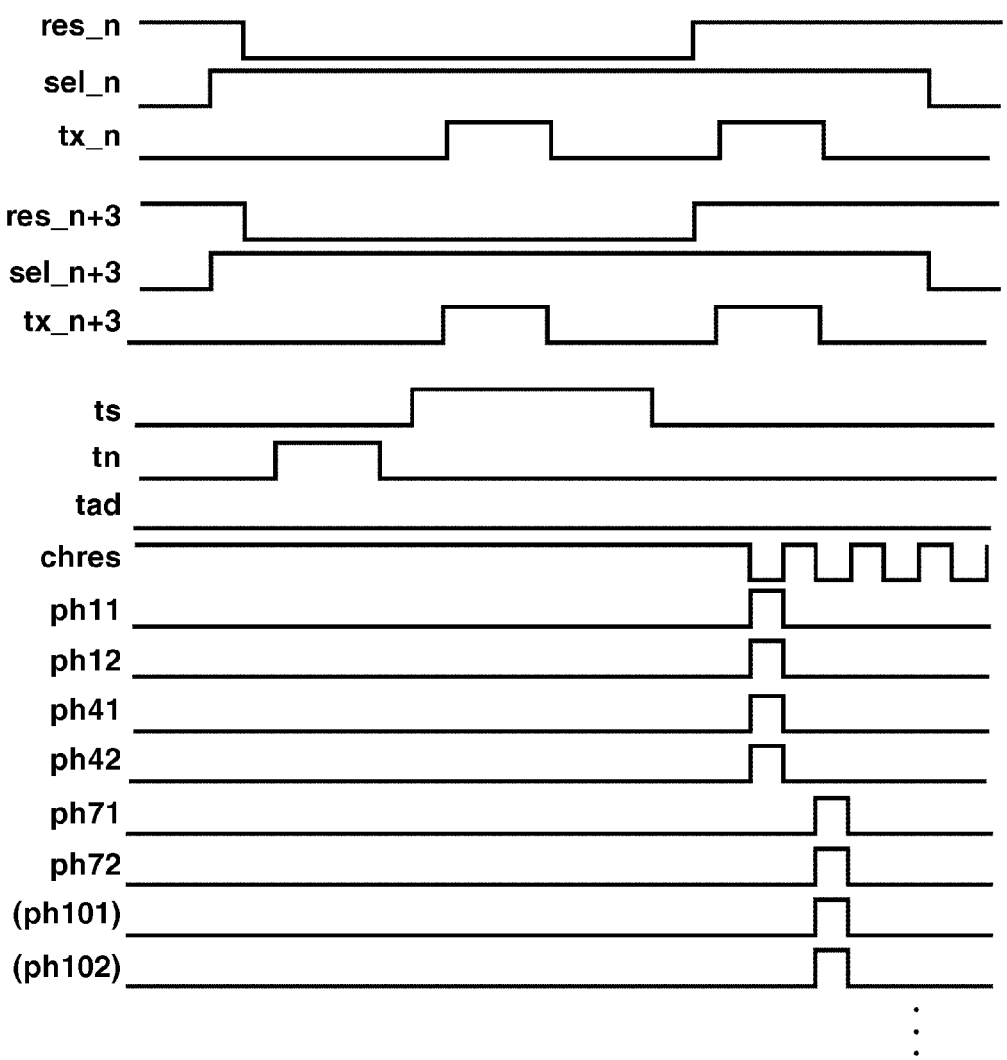
FIG. 7 illustrates a timing chart of the thinning reading operation in the image sensor according to the first exemplary embodiment.

FIG. 7 illustrates a timing chart of an operation for simultaneously reading signals in the n-th row and (n+3)-th row. Referring to FIG. 5, the signals sel_n−1, res_n−1, and tx_n−1 and the signals sel_n, res_n, and tx_n are driven. Similarly to the reading operation of the signals in the (n−1)-th row and the n-th row, the signal sel_n, res_n, and tx_n and signals sel_n+3, res_n+3, and tx_n+3 are driven, so that the signals in the n-th row and the (n+3)-th are simultaneously read. Since the operations up to store the S signal and the N signal of each pixel in the corresponding S signal storage capacities 306a and 306b and N signal storage capacities 307a and 307b by the signals ts and to are similar to the operation described with reference to FIG. 5, a specific description thereof is omitted.

In the operation for reading the signals in each column by the horizontal scanning circuit 311, the column selection signals ph11, ph12, ph41, and ph42 are simultaneously set to the high level, and the signals in the first and fourth columns are read out to the corresponding horizontal output line 312 via the corresponding horizontal transfer switches 309a and 309b and 310a and 310b. Next, after the horizontal output line 312 is temporarily reset by the signal chres, the column selection signals ph71, ph72, ph101, and ph102 (the signals ph101 and ph102 are not illustrated) are simultaneously set to the high level, and the signals in the seventh and tenth columns are read out to the corresponding horizontal output line 312.

After the signals in the n-th row and (n+3)-th row are read, the similar operation is performed to an (n+6)-th row and an (n+9)-th row, the signals are read every three-row. With the above-described operations, high-speed reading can be realized in which the pixel signals are thinned to one third thereof in the horizontal and vertical directions.

Next, a pixel addition and reading operation mode is described with reference to FIGS. 8 and 9. Signals of horizontal three pixels by vertical two pixels with the same color are averaged. The number of reading pixels from the image sensor 102 is thinned to one third in both the horizontal direction and the vertical direction, and the resultant signals are read.

Figure 8:
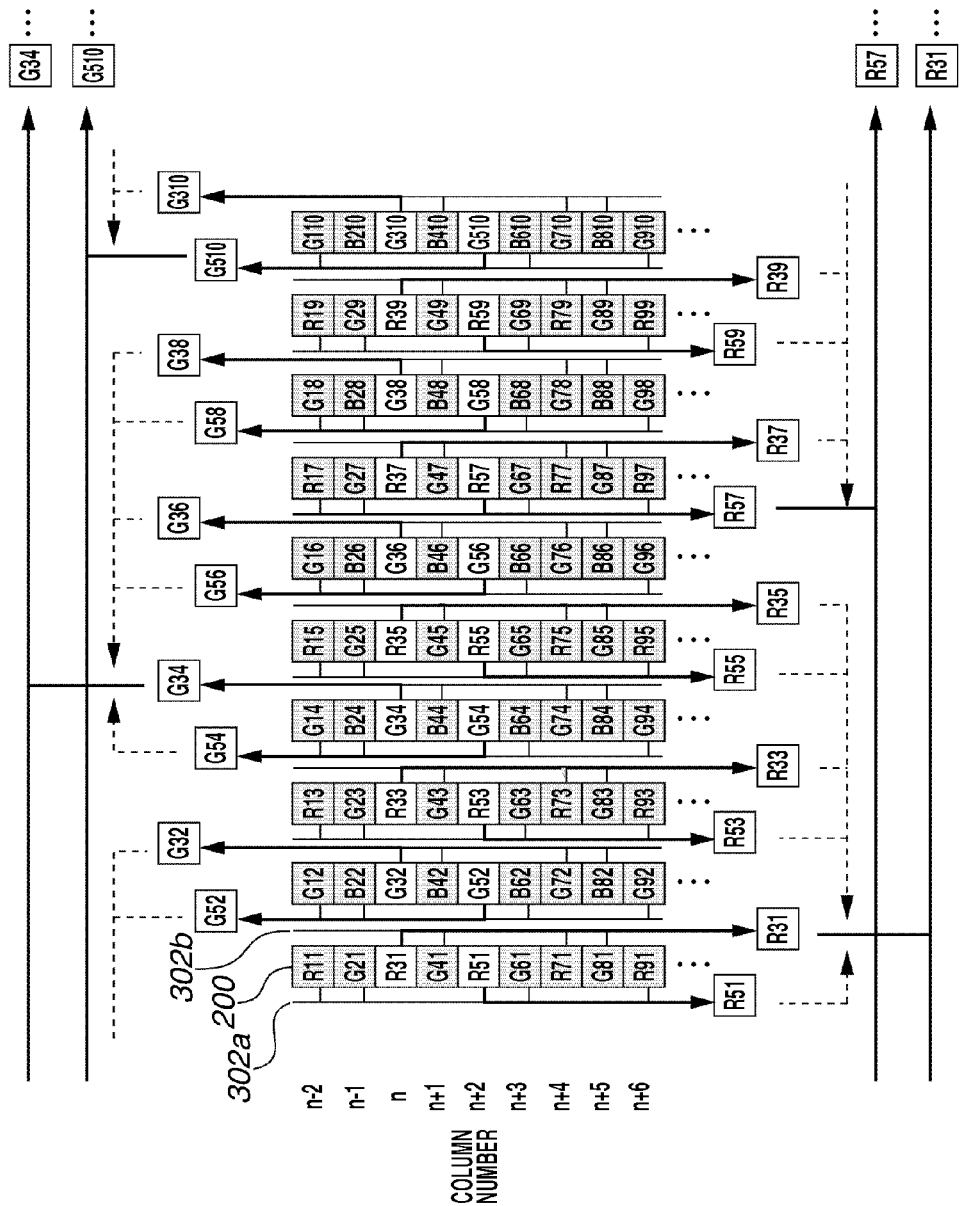
FIG. 8 illustrates a pixel averaging and reading operation in the image sensor according to the first exemplary embodiment.
Figure 9:
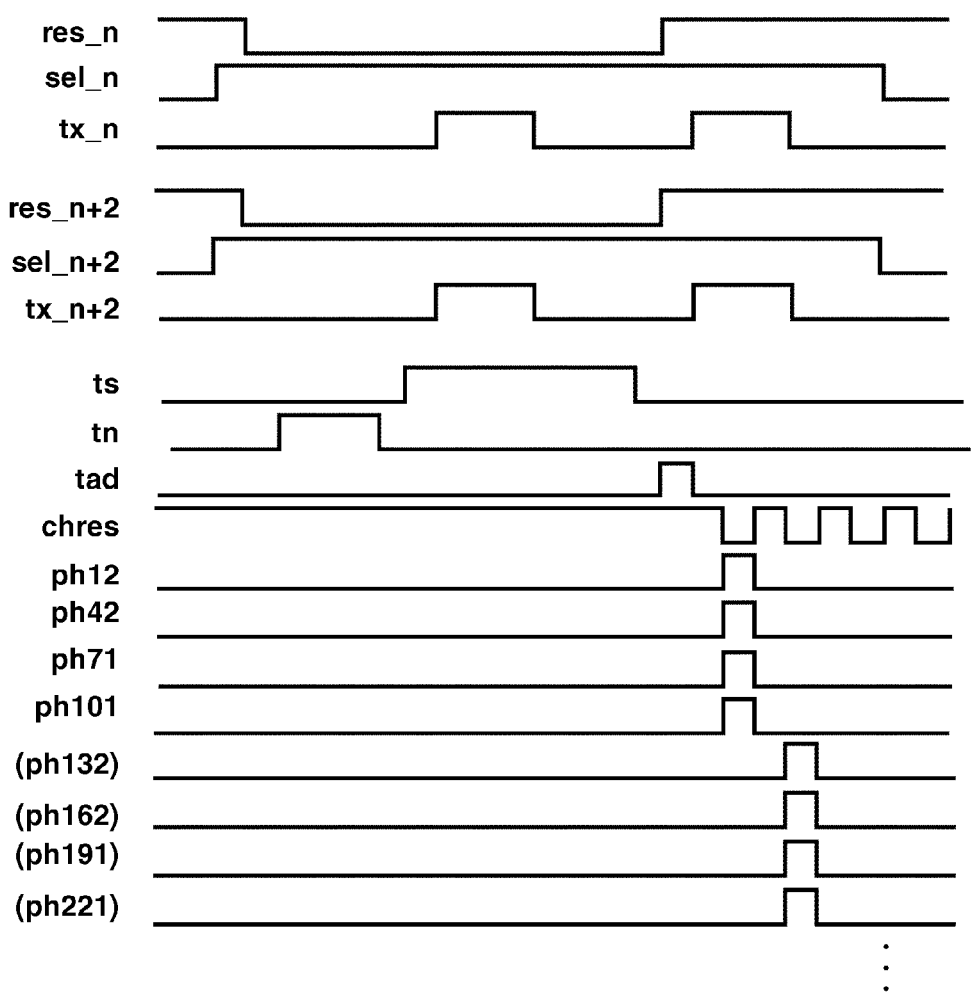
FIG. 9 illustrates a timing chart of the pixel averaging and reading operation in the image sensor according to the first exemplary embodiment.

FIG. 8 schematically illustrates an operation for averaging signals of the pixels in the n-th row and the (n+2)-th row and reading the signals. The signals in the (n+1)-th row are not read here. FIG. 9 illustrates a timing chart of the pixel addition and reading operation mode. The signals sel_n, res_n, and tx_n and the signals sel_n+2, res_n+2, and tx_n+2 are driven, and the signals ts and to are further driven, so that the S signals and the N signals in the n-th row and the (n+2)-th row are stored in the corresponding S signal storage capacities 306a and 306b and the corresponding N signal storage capacities 307a and 307b.

Before driving the horizontal scanning circuit 311, the operation for averaging the pixels is performed. In the pixel averaging operation, the signal tad is set to the high level so that the pixel addition switches 308s and 308n are turned ON to short-circuit the connected S signal storage capacities 306a and 306b and the connected N signal storage capacities 307a and 307b, respectively. Subsequently, the signal tad is set to the low level, and the pixel addition switches 308s and 308n are turned OFF. Thus, the pixel averaging operation ends.

At this point, pixels R31, R51, R33, R53, R35, and R55 in FIG. 8 are averaged. Thus, the signal obtained by averaging the six pixels R31 to R55 can be obtained even if the signals are read from any pair of the storage capacities among six pairs of the S signal storage capacities 306a and 306b and the N signal storage capacities 307a and 307b.

After ending the pixel averaging operation by setting the signal tad to the low level, the horizontal scanning circuit 311 is driven and the signal in each column is sequentially read. In this case, column selection signals ph12, ph42, ph71, and ph101 are simultaneously set to the high level, so that the signals after averaging can be read out. Although not illustrated, column selection signals ph132, ph162, ph191, and ph221 are simultaneously set to the high level and the similar operations are sequentially repeated, accordingly, the pixel signals after averaging horizontal three pixels by vertical two pixels are read corresponding to one line.

After ending the operation for reading the signals in the rows R and G in the n-th and (n+2)-th rows, the pixel signals in the (n+3)-th and (n+5)-th rows are similarly averaged and read, thus the signals in the rows G and B can be read. After that, by repeating the operation similar to the (n+6)-th and (n+8)-th rows and the (n+9)-the and (n+11)-th rows, the number of pixels in the horizontal direction and in the vertical direction are thinned to ⅓, horizontal three pixels' vertical two pixels with a similar color are added and averaged, thereby obtaining preferable image quality.

According to the first exemplary embodiment, there are three operation modes of the all-pixel reading mode, the thinning reading operation mode, and the pixel addition and reading operation mode. In the thinning reading operation mode, high-speed reading operation can be realized without performing pixel addition in the horizontal direction and in the vertical direction. However, without the pixel addition, the deterioration in image quality, e.g., moire can occur. According to a second exemplary embodiment, a configuration is described in which the pixel addition is performed only in the horizontal direction but the time required for the reading operation is not influenced by the pixel addition.

Figures 10, 10A:
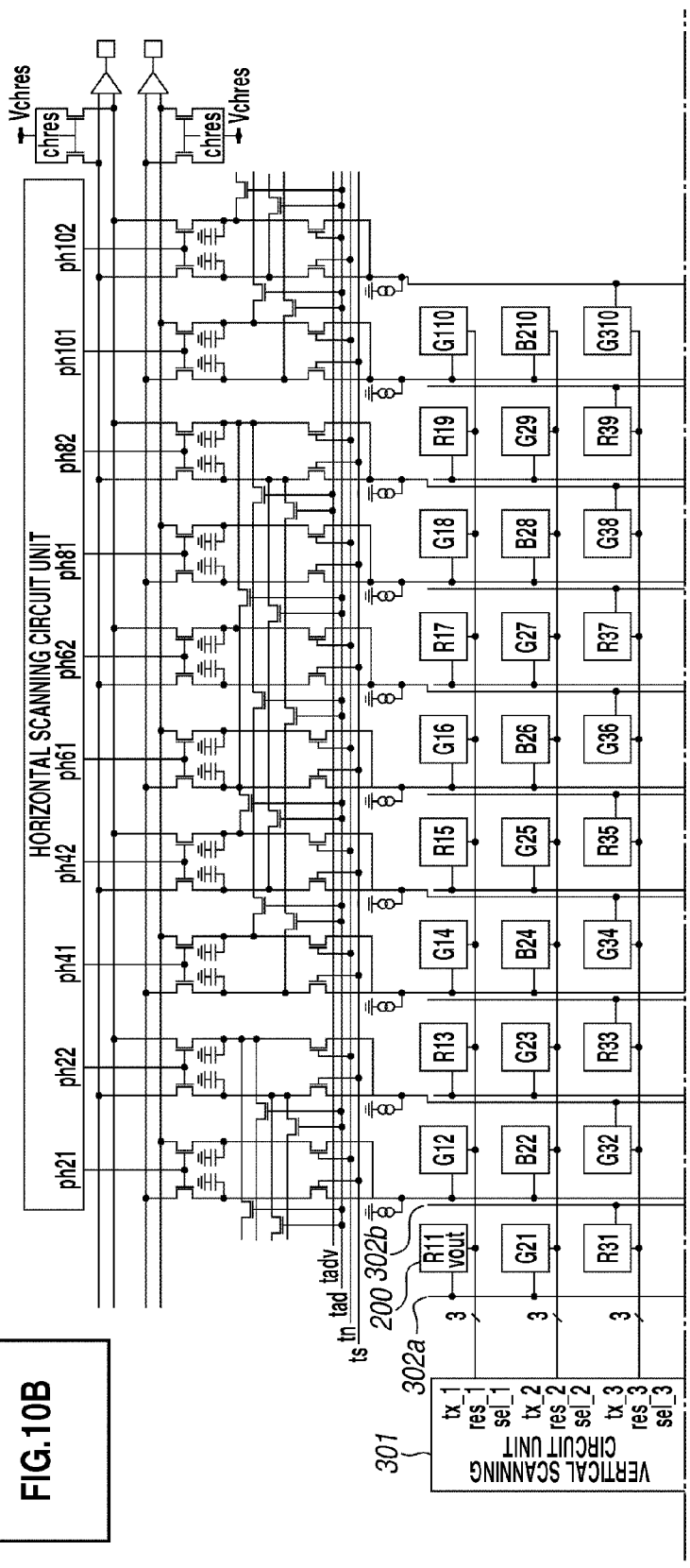
FIG. 10 and FIGS. 10A and 10B illustrate a configuration of a reading circuit in an image sensor according to a second exemplary embodiment.
Figure 10B:
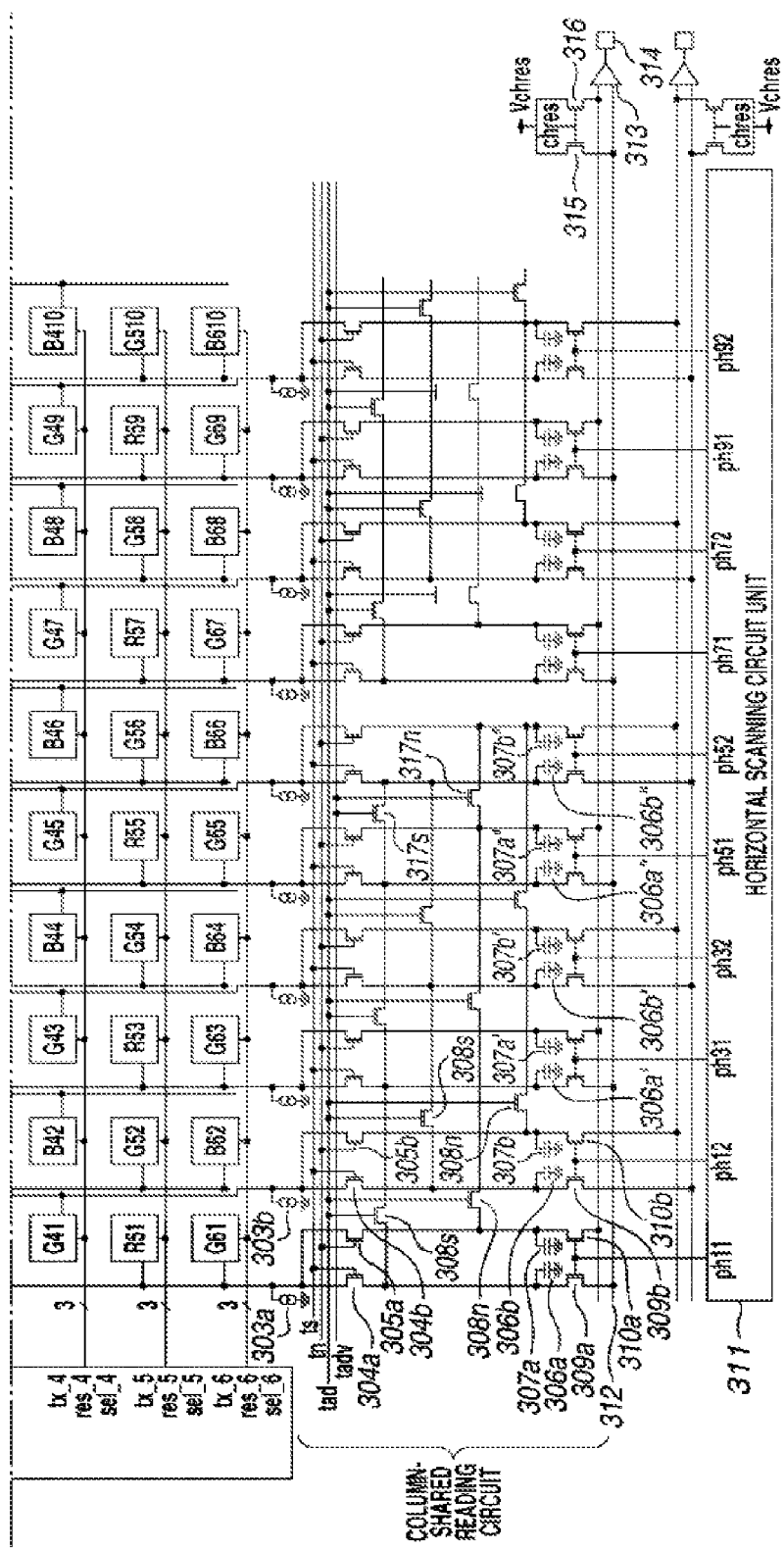

FIGS. 10A and 10B illustrate a configuration of a reading circuit of the image sensor 102, similarly to FIGS. 3A and 3B. In the second exemplary embodiment, a basic configuration is similar to that in FIGS. 3A and 3B. A connection between the pixel addition switches 308s and 308n and an arrangement of vertical pixel addition switches 317s and 317n are different from the configuration according to the first exemplary embodiment in FIGS. 3A and 3B. The pixel addition switches 308s (first and second switches) are not arranged between adjacent S signal storage capacities 306a and 306b illustrated in FIGS. 3A and 3B, but are arranged every other line to short-circuit the S signal storage capacities 306a, 306a' and 306a", or the S signal storage capacities 306b, 306b', and 306b". The pixel addition switches 308n on the N signal side are similarly arranged every other line to short-circuit the N signal storage capacities 307a, 307a', and 307a" and the N signal storage capacities 307b, 307b', and 307b".

The vertical pixel addition switch 317s (third switch) is arranged to short-circuit the adjacent S signal storage capacities 306a" and 306b". Similarly, the vertical pixel addition switch 317n on the N side is arranged to short-circuit the adjacent N signal storage capacities 307a" and 307b". The vertical pixel addition switches 317s and 317n are turned ON by setting a vertical pixel addition signal tadv to the high level.

Next, the reading operations in the respective operation modes are described below. The all-pixel reading operation mode is similar to that in the first exemplary embodiment, and thus the description thereof is not repeated. Since the pixel addition is not performed in the all-pixel reading operation mode, the signals tad and tadv are remained at the low level, and the pixel addition switches 308s and 308n and the vertical pixel addition switches 317s and 317n are set to OFF.

Figure 11:
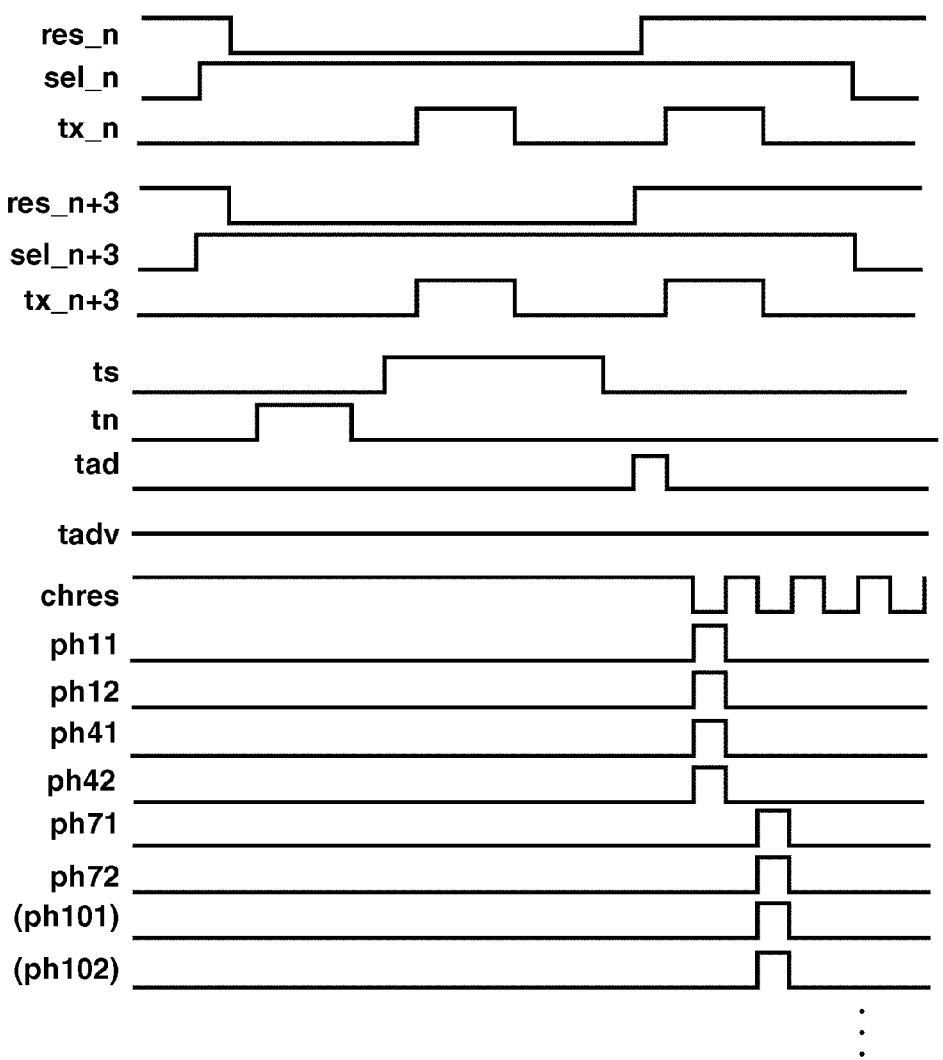
FIG. 11 illustrates a timing chart of an averaging and reading operation of horizontal pixels in an image sensor according to a second exemplary embodiment.

Next, the thinning reading operation mode using averaging of horizontal three pixels is described with reference to a timing chart in FIG. 11. Most of the drive signals are similar to those in FIG. 7. Addition of the signal tadv and the timing of the signal tad are different from those in FIG. 7.

More specifically, after the S signal is stored in the S signal storage capacity 306a (306a' and 306a") by the signal ts, the signal tad is once set to the high level before an operation of the horizontal scanning circuit 311 is started, and the pixel addition switches 308s and 308n are turned ON. At this time, since the signal tadv is remained at the low level, the vertical pixel addition switches 317s and 317n are set to OFF. Thus, horizontal three pixels are averaged every pixel with the same color in the Bayer array. In other words, pixel signals of the same color pixels in the different columns in the pixel array are averaged. Thereafter, the operation for thinning the pixels to one third thereof in the horizontal direction and reading the thinned pixels with the operation of the horizontal scanning circuit 311 is similar to that described with reference to FIG. 7.

Figure 12:
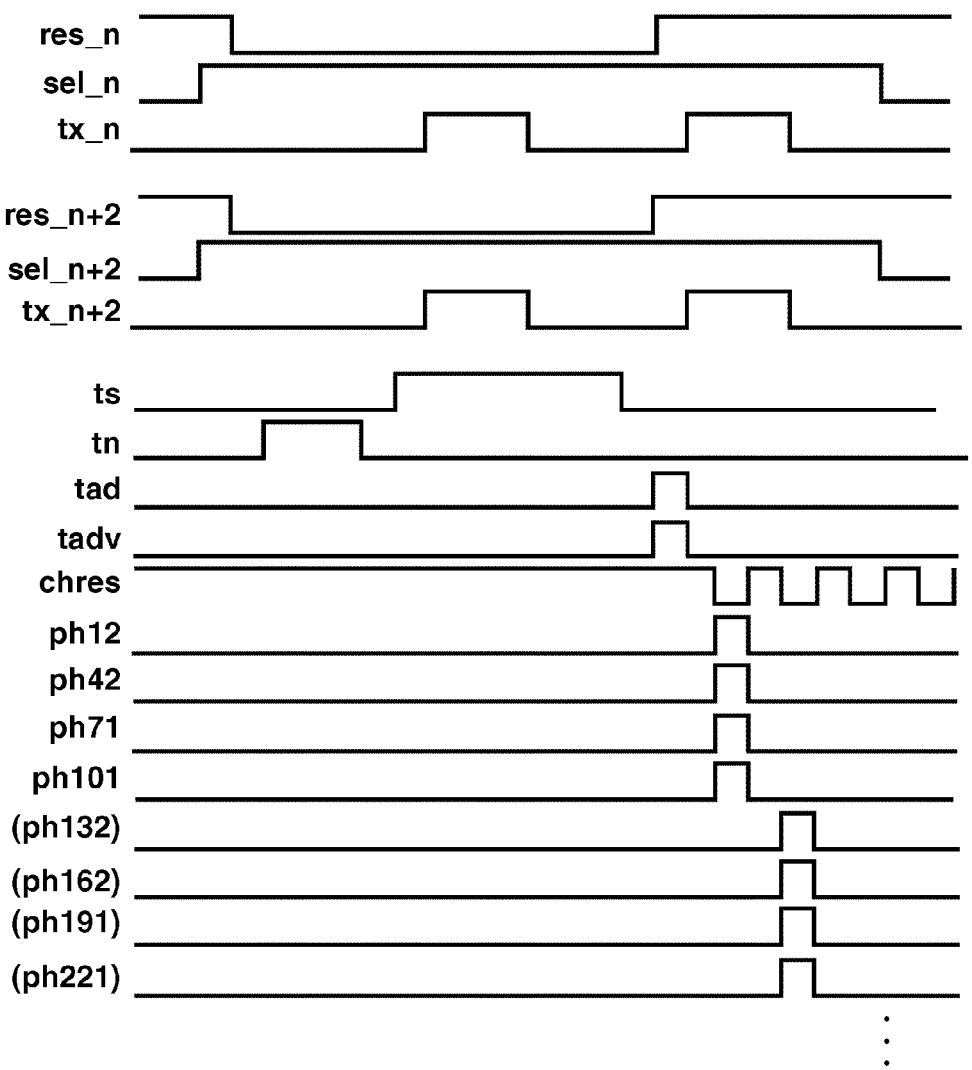
FIG. 12 illustrates a timing chart of a pixel averaging and reading operation in the image sensor according to the second exemplary embodiment.

Next, the pixel addition and reading operation mode using the addition and averaging of horizontal three pixels by vertical two pixels with reference to a timing chart illustrated in FIG. 12. The timing chart in FIG. 12 is similar to that in FIG. 9, and is different from FIG. 9 in that the signal tadv is added and the signal tadv is set to the high level simultaneously with the signal tad. With the signals tad and tadv, the signals in the S signal storage capacities 306a, 306a', 306a", 306b, 306b', and 306b" are averaged. The N signal storage capacities are similarly operated to the S signal storage capacities. Consequently, the operation similar to the averaging of the horizontal three pixels by vertical two pixels according to the first exemplary embodiment with reference to FIG. 8 can be realized.

Although the signals tad and tadv are simultaneously set to the high level, the pixel addition switches 308s and 308n may be once turned ON and then turned OFF, and the vertical pixel addition switches 317s and 317n may be turned ON. In this case, finally, the vertical pixel addition switches 317s and 317n have to be connected to the S signal storage capacity and the N signal storage capacity for reading out the signals to the horizontal output line 312.

Figure 13:
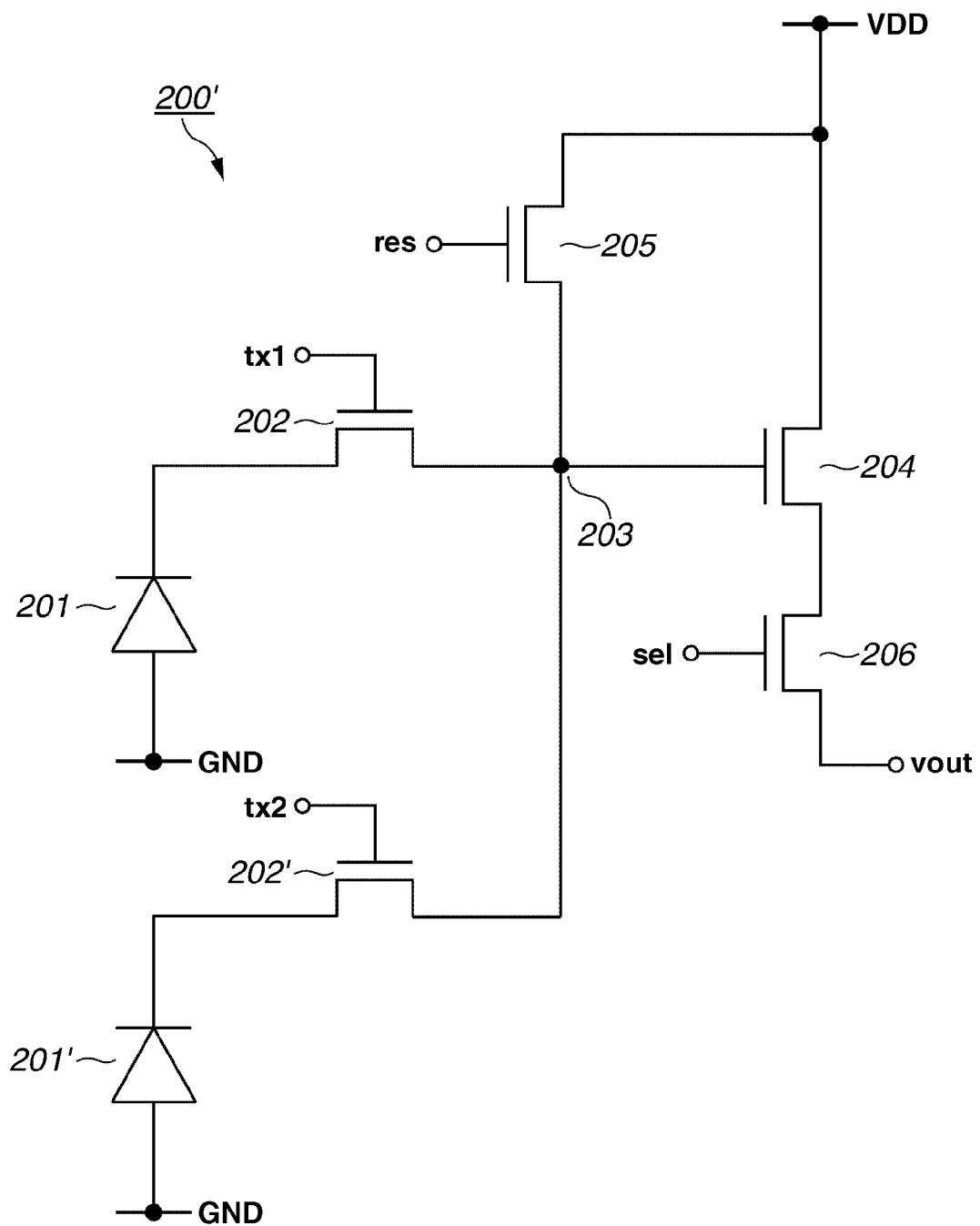
FIG. 13 illustrates a pixel portion in a floating diffusion (FD) shared configuration in an image sensor according to a third exemplary embodiment.

According to the first and second exemplary embodiments, each pixel includes the PD 201, the FD portion 203, the FD amplifier 204, the FD reset switch 205, and the pixel selection switch 206. Embodiments may include a configuration (hereinafter, referred to as an FD-shared configuration) in which two adjacent pixels in the same pixel row share the above-described components. FIG. 13 illustrates the configuration of a pixel pair 200' in the FD-shared configuration. With respect to top and bottom two pixels PDs 201 and 201' and transfer gates 202 and 202', the circuit configuration subsequent to the FD portion 203 are shared.

Figure 14B:
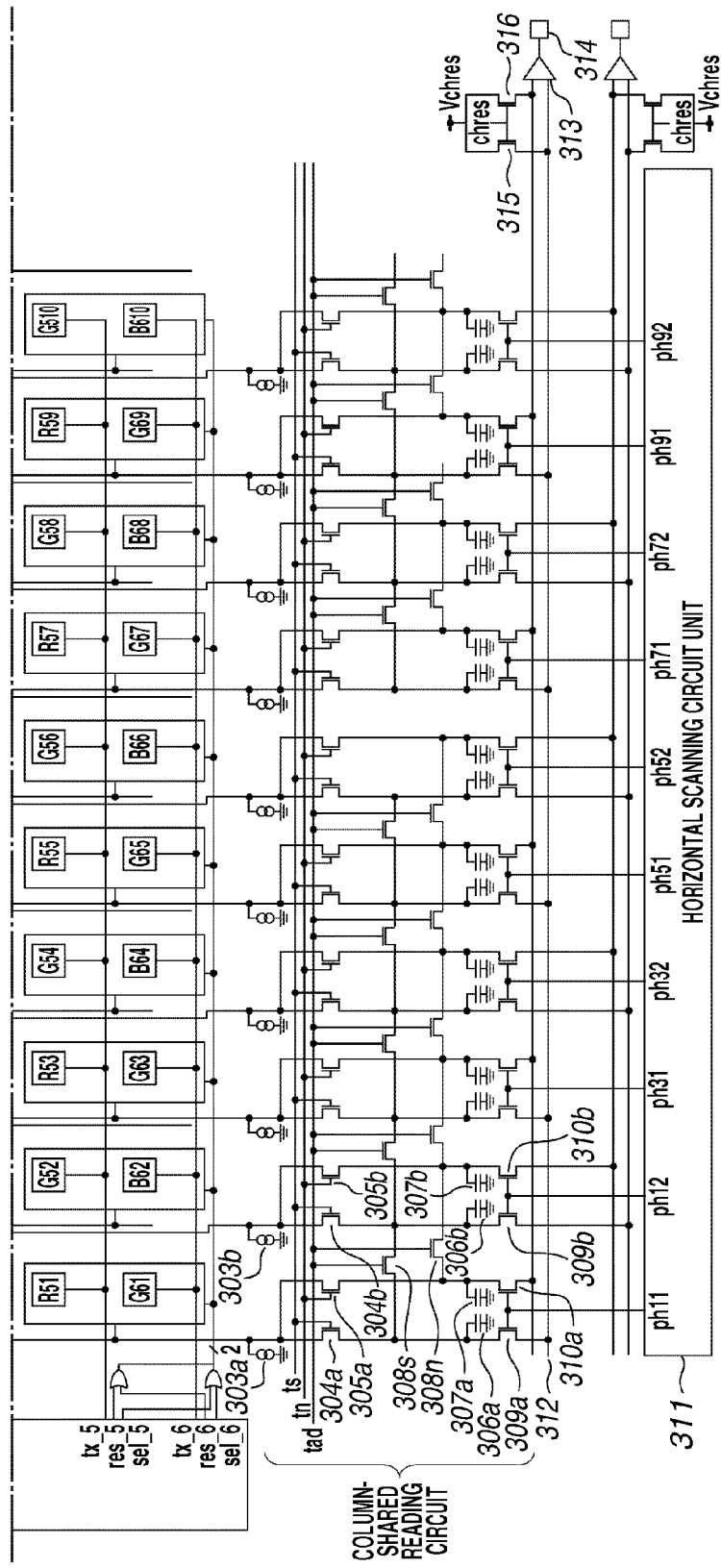

FIGS. 14A and 14B illustrate a configuration of a reading circuit of an image sensor 102 according to a third exemplary embodiment. A dotted line that surrounds the top and bottom two pixels (adjacent pixels in the vertical direction as the column direction in the same column of the pixel array) illustrates a pixel pair 200' that shares the FD portion 203. Signals res and sel as outputs from the vertical scanning circuit 301 are bounded every pixel sharing the FD portion 203 by OR gates 318 and 319, and are supplied to the pixel pair 200' formed with every two pixels. Another configuration is basically similar to that in FIGS. 3A and 3B, and a timing chart in each operation mode is similar to those in FIGS. 5, 7, and 9. Therefore, a specific description is omitted.

According to the first to third exemplary embodiments, in the thinning reading operation mode and the pixel addition and reading operation mode, it is assumed that the number of pixels read from the image sensor is thinned to one third thereof in the horizontal direction and in the vertical direction. Obviously, the embodiments are not limited to this configuration and the pixels may be thinned at another thinning rate. The unit for averaging the pixels is three pixels in the horizontal direction and two pixels in the vertical direction. However, the unit for addition is not limited to this example. In particular, with respect to the number of addition in the horizontal direction, an arbitrary number of pixels can be the unit for addition. As is Obvious from the description according to the exemplary embodiments, the number of the vertical output lines in every pixel row is an upper limit of the number of addition in the vertical direction.

Aspects can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). Each apparatus may be implemented within, include, or otherwise be connected to a central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs. In an example, a computer-readable medium may store a program that causes an apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-025863 filed Feb. 8, 2010, which is hereby incorporated by reference herein in its entirety.

What is claimed is:

1. A solid-state image sensor comprising:
a pixel array including a plurality of pixels, wherein each pixel includes a photoelectric conversion element configured to photoelectrically convert an object image and is two-dimensionally arranged in a column direction of a column and in a row direction of a row;
first and second output lines arranged in each column to transfer a pixel signal output from each pixel in the column direction, wherein pixel signals of same color adjacent pixels in the column direction in a same column of the pixel array are configured to be alternately output to the first and second output lines;
first and second storage units configured to temporarily store the pixel signals of the same color adjacent pixels transferred in the column direction from the respective first and second output lines; and
switches configured to short-circuit the first storage units and the second storage units after the first and second storage units store the pixel signals of the same color adjacent pixels.

2. The solid-state image sensor according to claim 1, wherein the photoelectric conversion elements of adjacent pixels in the column direction in the same column of the pixel array share a floating diffusion portion, and signals from the adjacent floating diffusion portions in the column direction in the same column are configured to be alternately output to the first and second output lines.

3. The solid-state image sensor according to claim 1, wherein the pixel signals of the same color adjacent pixels are stored in the first and second storage units, and then the first storage units and the second storage units are short-circuited by the switches to average the pixel signals of the same color adjacent pixels.

4. The solid-state image sensor according to claim 3, wherein the solid-state image sensor is driven in a first mode for reading the pixel signals of the same color adjacent pixels without averaging the pixel signals, or in a second mode for averaging the pixel signals of the same color adjacent pixels and reading the averaged pixel signals.

5. A solid-state image sensor comprising:
a pixel array including a plurality of pixels, wherein each pixel includes a photoelectric conversion element that photoelectrically converts an object image and is two-dimensionally arranged in a column direction of a column and in a row direction of a row;
first and second output lines arranged in each column to transfer a pixel signal output from each pixel in the column direction, wherein pixel signals of same color adjacent pixels in the column direction in a same column of the pixel array are configured to be alternately output to the first and second output lines;
first and second storage units configured to temporarily store the pixel signals of the same color adjacent pixels transferred in the column direction from the respective first and second output lines; and
first and second switches configured to respectively short-circuit the first storage units and the second storage units in different columns after the first and second storage units store the pixel signals of the same color adjacent pixels.

6. The solid-state image sensor according to claim 5, further comprising: third switches configured to short-circuit the first storage units in the different columns that are short-circuited by the first switch and the second storage units in the different columns that are short-circuited by the second switch to average the pixel signals in the different columns averaged by the first switches and the pixel signals in the different columns averaged by the second switches.

7. The solid-state image sensor according to claim 5, wherein the pixel signals of the same color adjacent pixels are stored in the first and second storage units, and then the first storage units and the second storage units in the different columns are respectively shortcircuited by the first and second switches to average the pixel signals of the same color adjacent pixels in the different columns.

8. The solid-state image sensor according to claim 5, wherein the photoelectric conversion elements of adjacent pixels in the column direction in the same column of the pixel array share a floating diffusion portion, and signals from the adjacent floating diffusion portions in the column direction in the same column are configured to be alternately output to the first and second output lines.

9. The solid-state image sensor according to claim 8, wherein the solid-state image sensor is driven in a first mode for reading the pixel signals of the same color pixels in the different columns without averaging the pixel signals, or in a second mode for averaging the pixel signals of the same color pixels in the different columns and reading the averaged pixel signals.

10. The solid-state image sensor according to claim 8, further comprising: a third switches configured to further short-circuit the short-circuited first storage units and the short-circuited second storage units to further average the pixel signals in the different columns that are averaged by short-circuiting the first storage units and the pixel signals in the different columns that are averaged by short-circuiting the second storage units.

11. The solid-state image sensor according to claim 10, wherein the solid-state image sensor is driven in any one of a first mode for reading the pixel signals of the same color pixels in the different columns without averaging the pixel signals, a second mode for averaging the pixel signals of the same color pixels in the different columns and reading the averaged pixel signals, and a third mode for further averaging the pixel signals in the different columns that are averaged by short-circuiting the first storage units and the pixel signals in the different columns that are averaged by short-circuiting the second storage units and reading the averaged pixel signals.

12. An imaging apparatus comprising:
a solid-state image sensor having a pixel array including a plurality of pixels, wherein each pixel includes a photoelectric conversion element that photoelectrically converts an object image and is two-dimensionally arranged in a column direction of a column and in a row direction of row;
first and second output lines that are arranged in each column to transfer a pixel signal output from each pixel in the column direction, wherein pixel signals of same color adjacent pixels in the column direction in a same column of the pixel array are alternately output to the first and second output lines;

first and second storage units configured to temporarily store the pixel signals of the same color adjacent pixels transferred in the column direction from the respective first and second output lines, and switches configured to short-circuit the first storage units and the second storage units after the first and second storage units store the pixel signals of the same color adjacent pixels; and a signal processor configured to perform predetermined processing on the pixel signal output from the solid-state image sensor, output image data, and cause a storage medium to store the image data.

13. An imaging apparatus comprising:

a solid-state image sensor having a pixel array including a plurality of pixels, wherein each pixel includes a photoelectric conversion element that photoelectrically converts an object image and is two-dimensionally arranged in a column direction of a column and in a row direction of a row;

first and second output lines arranged in each column to transfer a pixel signal output from each pixel in the column direction, wherein pixel signals of same color adjacent pixels in the column direction in a same column of the pixel array are configured to be alternately output to the first and second output lines;

first and second storage units configured to temporarily store the pixel signals of the same color adjacent pixels transferred in the column direction from the respective first and second output lines, and first and second switches configured to respectively short-circuit the first storage units and the second storage units in different columns after the first and second storage units store the pixel signals of the same color adjacent pixels; and a signal processor configured to perform predetermined processing on the pixel signal output from the solid-state image sensor, output image data, and cause a storage medium to store the image data.

* * * * *